United States Patent
Turpin et al.

(10) Patent No.: US 10,520,070 B2
(45) Date of Patent: Dec. 31, 2019

(54) NO-BACK DEVICE FOR FLIGHT CONTROL SURFACE ACTUATOR

(71) Applicant: Goodrich Actuation Systems SAS, Buc (FR)

(72) Inventors: Pierre M. Turpin, Saint Malo (FR); Thomas M. Moulon, Ermont (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 937 days.

(21) Appl. No.: 15/093,793

(22) Filed: Apr. 8, 2016

(65) Prior Publication Data
US 2016/0297514 A1 Oct. 13, 2016

(30) Foreign Application Priority Data
Apr. 9, 2015 (EP) .................................... 15305521

(51) Int. Cl.
*F16H 25/24* (2006.01)
*B64C 13/28* (2006.01)
*F16H 35/00* (2006.01)

(52) U.S. Cl.
CPC ......... *F16H 25/2454* (2013.01); *B64C 13/28* (2013.01); *F16H 2035/005* (2013.01)

(58) Field of Classification Search
CPC ...... B64C 13/28; F16H 25/20; F16H 25/2454
USPC ............................................ 74/89.38, 89.39
See application file for complete search history.

(56) References Cited

U.S. PATENT DOCUMENTS

| | | | |
|---|---|---|---|
| 3,228,632 A | 1/1966 | Werner | |
| 5,582,390 A * | 12/1996 | Russ | ........................ B64C 13/28 244/99.2 |
| 6,109,415 A * | 8/2000 | Morgan | ................... B64C 13/28 192/223.1 |
| 2005/0178225 A1* | 8/2005 | Erikson | ............... F16H 25/2409 74/89.42 |
| 2014/0271264 A1 | 9/2014 | Florindi et al. | |
| 2016/0280356 A1* | 9/2016 | Medina | ..................... B64C 5/02 |

OTHER PUBLICATIONS

Extended European Search Report; Application No. 15305521.5-1752; dated Nov. 17, 2015; 4 pages.

* cited by examiner

*Primary Examiner* — Prasad V Gokhale
(74) *Attorney, Agent, or Firm* — Cantor Colburn LLP (57) ABSTRACT

Disclosed is an actuator for varying the position of a flight control surface on an aircraft, wherein the actuator comprises a no-back device including a backlash adjuster, which is arranged to select a plurality of different backlash lengths. The backlash adjuster may be a nut which moves relative a housing of the no-back device by rotating the nut. Also disclosed is a method of adjusting the backlash (B) in a flight control surface actuator, by moving the backlash adjuster axially to adjust the backlash (B) to a desired value.

15 Claims, 6 Drawing Sheets

NO-BACK DEVICE FOR FLIGHT CONTROL SURFACE ACTUATOR

FOREIGN PRIORITY

This application claims priority to European Patent Application No. 15305521.5 filed Apr. 9, 2015, the entire contents of which is incorporated herein by reference.

TECHNICAL FIELD

The present disclosure relates to a no-back device for a flight control surface actuator.

BACKGROUND

It is known to use a ballscrew actuator to control the position of a flight control surface in order to "trim" an aircraft's position during flight. The actuator is used to provide a set position of a flight control surface to account for differential load distributions acting on the aircraft due to aerodynamic forces that may undesirably alter the aircraft's position.

It is also known to use a no-back device to prevent the actuator from being back-driven by the aerodynamic forces acting on the flight control surface, which could place the aircraft out of "trim". Such a no-back device is disclosed in U.S. Pat. No. 6,109,415. The no-back device disclosed therein provides a flange fixed to a screw of the ballscrew disposed between two sets of braking members. When an aerodynamic load is applied to the flight control surface, the screw is loaded in either compression or tension, depending on the direction of the aerodynamic load. The loading causes the flange to shift into contact with one of the two braking members, which then acts to prevent rotation of the screw. The maximum distance that the flange can travel until it is engaged in contact with one of the braking members is known as the "backlash" associated with the no-back device. It may be necessary to adjust the backlash of the no-back device due to operational requirements and/or to account for wear in the device (e.g. wearing of the braking materials over time may increase the backlash). The present disclosure seeks to provide an improved no-back device that allows for a more convenient method for adjusting the backlash associated therewith.

SUMMARY OF THE INVENTION

According to one aspect of the present disclosure, there is provided an actuator for varying the position of a flight control surface on an aircraft. The actuator comprises a ballscrew and a no-back device. The ballscrew has a screw for connection to a driving means and a nut mounted on the screw for connection to a flight control surface. The no-back device is positioned around an axial section of the screw and is configured to prevent the nut, when subjected to an axial load, back-driving the screw, and to allow a limited backlash. The backlash is the possible amount of axial movement of the screw relative to the no-back device (in either axial direction). The no-back device comprises a backlash adjuster arranged to select (i.e. provide) a plurality of different backlash lengths.

As such, the backlash adjuster can be used to selectively allow different backlash lengths, i.e. different maximum possible amounts of axial movement of the screw relative to the no-back device.

The backlash adjuster may be arranged to select a plurality of discrete backlash lengths (in other words, there may be intermediate lengths, between the discrete lengths that the adjuster cannot select).

References to "axial" should be understood to mean along the direction of the rotational axis of the screw or parallel thereto.

The backlash adjuster can therefore be used to selectively change the backlash of the no-back device between at least two different axial lengths.

The backlash may be present in the no-back device as the axial length of one or more (such as two) gaps between parts of the no-back device that cannot normally be compressed. In order to close a gap, the screw will need to move axially and may have to overcome a biasing force that usually holds the gap open.

The actuator may be a trimmable horizontal stabilizer actuator (THSA) or any other actuator that controls a flight control surface on an aircraft.

The no-back device may comprise a housing that at least partially surrounds a portion of the screw. For example, the housing may fully encircle a portion of the screw. The housing and the no-back device may be fixedly secured (directly or indirectly) to the screw.

Moving the backlash adjuster axially relative to the screw may adjust the backlash of the no-back device. As discussed above, the backlash may in the form of one or more axial gaps, and moving the adjuster axially may reduce or expand the axial length of the gap.

The backlash adjuster may comprise a threaded member, such as an adjustment nut. The nut may be annular and may be placed around the screw so that it can move freely axially relative thereto.

Moving the threaded member, e.g. the nut, axially relative to the screw may comprise rotating the threaded member, e.g. the nut, relative to the screw.

As such, the angular position of the nut may determine the backlash of the no-back device.

The nut and housing may have co-operating threads.

The no-back device may comprise a first brake assembly for preventing rotation of the screw in one direction, a second brake assembly for preventing rotation of the screw in a second direction and a radially extending flange operatively connected to the screw for rotation therewith. The flange may be positioned between the first and second brake assemblies.

The no-back device may be arranged so that when the screw is under a compressive load, it moves axially so that the flange contacts the first brake assembly and when it is under a tensile load, it moves axially, in the opposite direction, so that the flange contacts the second brake assembly, or vice versa.

The housing of the no-back device may have a first end having an opening for receiving the backlash adjuster and a second opposed end. The first brake assembly may be positioned between the flange and the backlash adjuster. The second brake assembly may be positioned between the flange and the second end. The no-back device may be configured such that moving the backlash adjuster axially relative to the housing may cause the separation between the backlash adjuster and the second end to be varied accordingly.

For example, moving the backlash adjuster towards to the flange may decrease the backlash (e.g. by reducing the length of an axial gap) and moving the backlash adjuster away from the flange may increase the backlash (e.g. by increasing the length of an axial gap).

The no-back device may comprise one or more biasing members for urging the first and/or second brake assemblies towards the flange. As mentioned above, the one or more biasing members may provide a biasing force that creates one or more gaps that provide the backlash.

The one or more biasing members may comprise one or more springs, such as compression springs.

Moving the backlash adjuster may cause the compression on the one or more springs to be varied.

There may be a first spring or set of springs located on a first side of the flange and a second spring or set of springs on the other side. For example, the first spring(s) may be located at or adjacent the backlash adjuster (e.g. a nut) and the second spring(s) may be located at or adjacent the second end of the housing. The first spring(s) may be secured to the backlash adjuster (e.g. in a recess thereof) and extend away from the backlash adjuster towards the flange. The second spring(s) may be secured to the second end of the housing (e.g. in a recess thereof) and may extend from the housing towards the flange.

The first and second brake assemblies may each comprise a friction plate for engagement with the flange and a ratchet wheel having one or more pawls associated therewith.

The friction plates may each comprise skewed rollers.

The no-back device may further comprise first and second thrust bearings for allowing rotation between the first and second brake assemblies and the backlash adjuster and the second end of the housing, respectively.

The backlash adjuster may be arranged to select at least three, at least five or at least ten different backlash lengths. Each length may correspond to a discrete position of the backlash adjuster or a part thereof.

The actuator may further comprise a lock for retaining the backlash adjuster in a chosen axial position. For example, the lock may retain the nut in a selected angular position.

The lock may comprise one or more fastening members and a plate having one or more first apertures for receiving the one or more fastening members. The backlash adjuster may comprise one or more second apertures for receiving the one or more fastening members.

The fastening members may be threaded bolts or screws.

The plate may close the first end of the housing around the screw, with the backlash adjuster positioned between the plate and the flange.

The second apertures on the backlash adjuster may comprise complementary threads to the fastening members.

The plate may comprise engagement features to prevent rotation of the plate relative to the housing. For example, the engagement features may comprise recesses for receiving a non-rotating portion of the no-back device, such as a protruding part of the pawl shaft(s) upon which the pawl(s) are held, or a part of the housing.

The present disclosure also extends to a flight control surface assembly comprising an actuator as described above (in any variation thereof) and a flight control surface operatively connected to the ball screw.

The present disclosure also extends to a method of adjusting the backlash in a flight control surface actuator as described above (in any variation thereof), the method comprising moving the backlash adjuster axially relative to the screw to adjust the backlash to a desired value.

Moving the backlash adjuster axially may comprise rotating the backlash adjuster relative to the screw.

The no-back device may comprise a lock having a plate and one or more fastening members and the method may comprise passing the one or more fastening members through one or more first apertures in the plate and into one or more second apertures in the backlash adjuster to secure the backlash adjuster axially.

The plate may be configured such that, prior to inserting the fastening members, the backlash adjuster can be moved axially with the plate in place on the no-back device. In other words, the backlash adjuster may be able to be moved without having to remove the plate. For example, the backlash adjuster may be able to be rotated by passing a tool through the opening in the first end of the housing.

The method may comprise aligning the plate with a non-rotatable feature of the no-back device, such as a protruding part of the pawl shaft(s) upon which the pawl(s) are held, or a part of the housing, prior to locking the plate into position.

The various aspects of the present disclosure may allow easier backlash adjustment than in prior art actuators.

BRIEF DESCRIPTION OF THE DRAWINGS

Exemplary embodiments and features of the present disclosure will now be described by way of example only, and with reference to FIGS. 1 to 9, of which.

DETAILED DESCRIPTION OF THE DRAWINGS

Figure 1:
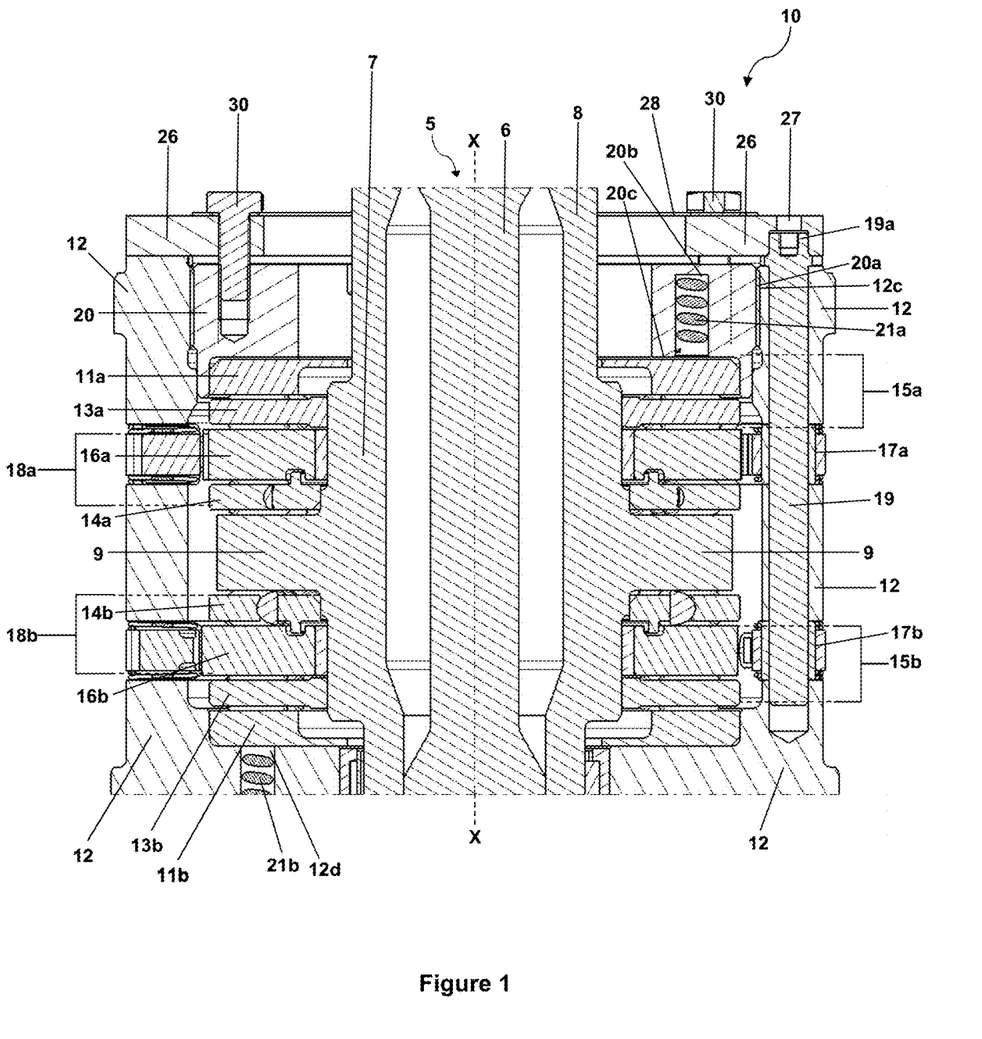
FIG. 1 is a cross-sectional view through part of a no-back device in accordance with an embodiment of the present disclosure.
Figure 2:
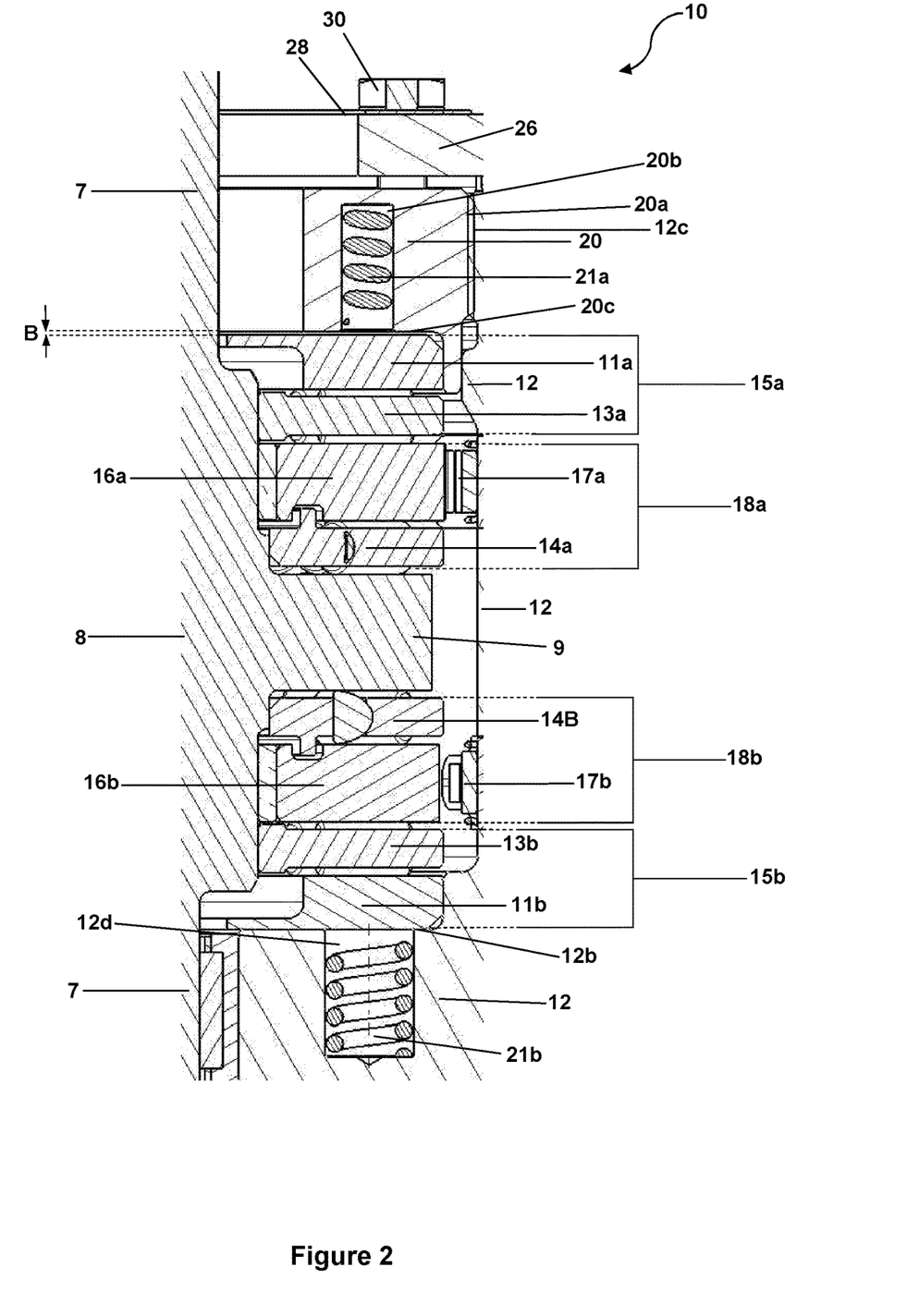
FIG. 2 is part of another cross-sectional view through a no-back device in accordance with an embodiment of the present disclosure.

FIGS. 1 and 2 show cross-sectional views through an exemplary no-back device 10 installed on a vertically oriented screw of a ballscrew actuator, in accordance with an embodiment of the present disclosure. It will be understood to one skilled in the art that the following description applies equally to a horizontally oriented ballscrew actuator.

The no-back device 10 comprises a housing 12 that is disposed around a screw 6 of a ballscrew assembly (not shown). As is known in the art, the ballscrew assembly further comprises a nut secured to the screw 6 and in operative connection with a flight control surface. A flanged sleeve 8 is fixed to the screw 6 to be rotated together by a motor (not shown), positioned either downstream or upstream of the no-back device 10.

Flanged sleeve 8 has a radial flange 9 and an axial portion 7. The radial flange 9 extends radially from the axial portion 7 towards the housing 12, and is sandwiched between upper and lower braking assemblies 18*a*, 18*b*. Braking assemblies 18*a*, 18*b* each comprise a ratchet wheel 16*a*, 16*b* in axial contact with a friction disk 14*a*, 14*b* adjacent and in axial contact with the flange 9. The friction disks 14*a*, 14*b* and ratchet wheels 16a, 16b are mounted for free rotation relative to the screw 6. Upper and lower pawls 17a, 17b are mounted radially outwardly from the ratchet wheels 16a, 16b on pawl shaft 19 (also shown in FIG. 3), which is retained within housing 12. While only one pawl is shown, there are actually three upper pawls 17a and three lower pawls 17b and three pawl shafts 19 (see FIG. 3), in this embodiment.

Disposed axially above and below ratchet wheels 16a, 16b are thrust bearings 15a, 15b. Each thrust bearing 15a, 15b comprises a bearing 13a, 13b and a bearing race 11a, 11b. The bearings 13a, 13b are in contact with ratchet wheels 16a, 16b.

The no-back device also includes a backlash adjustment nut 20. The nut 20 has an external thread 20a that engages with an internal thread 12c on the housing 12. The adjustment nut 20 comprises a plurality of springs 21a secured in recesses 20b (FIG. 2). Another plurality of springs 21b is held in the recesses 12d in the lower end of housing 12. The lower spring 21b extends from the surface 12b of the housing 12 and contacts the lower bearing race 11b. The upper spring 21a extends from surface 20c of nut 20 and contacts the upper bearing race 11a. The springs 21a, 21b load the respective adjacent thrust bearing assembly 15a, 15b towards the adjacent ratchet wheel 16a, 16b, which, in turn, are loaded towards the adjacent friction disk 14a, 14b. This causes the friction disks 14a, 14b to be loaded into loose frictional engagement with flange 9. It is to be understood that "loose frictional engagement" means that the friction disks 14a, 14b contact the portion 9 of the flange 8 with sufficient force to prohibit idle rotation thereof, but do not prohibit motorised actuation of the ballscrew 5. The engagement of the friction disks 14a, 14b with flange 9 provide a braking force on the screw 6 to ensure it cannot "freewheel" and allow unwanted flight control surface movement, when not being actuated.

The spring loading of the thrust bearings 15a, 15b generates an axial displacement or backlash (denoted by B) between the adjustment nut 20 and the thrust bearing 15a. FIG. 2 shows the screw 6 in a downwardly loaded position so that the entire backlash (i.e. gap) is between the nut surface 20c and the bearing race 11a. It should be understood however that, if the screw 6 was held in an unloaded and perfectly central position, then a first gap of length 0.5 B would be present at this location and a second gap of the same length would be present between the housing surface 12b and bearing race 11b.

When the screw 6 is back-driven by the flight control surface, it will either be under compressive or tensile loading, depending on the direction of the aerodynamic load. When under tensile or compressive loading, respectively, the flat upper or lower surfaces of the flange 9 are forced into tight frictional engagement with the upper or lower friction disk 14a, 14b, and the respective friction disk 14a, 14b will be pushed into tight frictional engagement against the respective ratchet wheel 16a, 16b.

Figure 3:
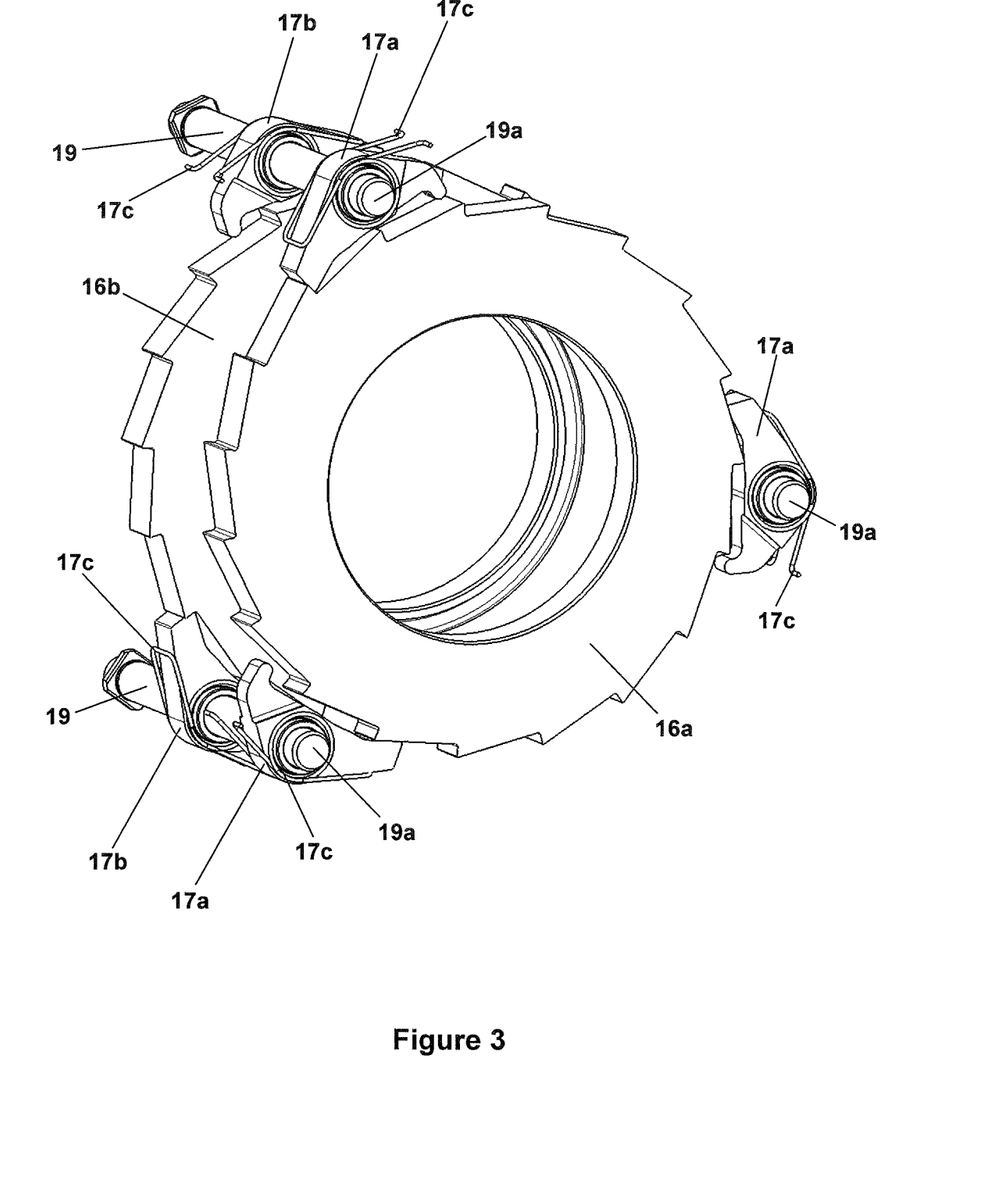
FIG. 3 is a 3D view of a pawl and ratchet wheel system used in the exemplary device of FIGS. 1 and 2.

As shown in FIG. 3, the ratchet wheels 16a, 16b cooperate with pawls 17a, 17b, which are spring loaded via springs 17c disposed around pawl shaft 19 (and secured to housing 12—see FIG. 7) into engagement with teeth on the ratchet wheels 16a, 16b, to allow rotation in only one direction, as is known in the art. When each respective ratchet wheel 16a, 16b is in tight friction engagement with friction disks 14a, 14b they are configured to permit rotation in the "opposing" direction to that of ballscrew rotation, and prevent rotation in the same direction as ballscrew rotation, unless the frictional force from the tight engagement between the brake disk 14a, 14b and the flange portion 9 is overcome. This prevents unwanted driving of ballscrew through aerodynamic forces.

For the flange portion 9 to be forced into tight frictional engagement with the brake disks 14a, 14b there is required a degree of axial movement either upward (in the case of tensile loading) or downward (in the case of compressive loading) due to the backlash B present in the device. The degree of axial movement can be controlled by adjusting the backlash B.

As will be appreciated by the skilled person, a minimum "functional" backlash is needed in a no-back device (e.g. 0.1 mm to 1.0 mm) to account for vibrational forces, which may otherwise damage the device, and to prevent the ballscrew assembly jamming. Too larger backlash, however, may allow too much axial movement of the ballscrew flange 9, and allow unacceptable amounts of unwanted flight control surface movement. To aid in the adjustment of the backlash, an inner surface 12c of the housing 12 and an outer surface 20a of the adjustment nut 20 are co-operatively threaded (as discussed above) to allow axial movement of the adjustment nut 20. This allows the adjustment nut 20 to be displaced axially to reduce or increase the axial backlash B of the device by selectively varying the compression of the upper and lower springs 21a, 21b.

Figure 4:
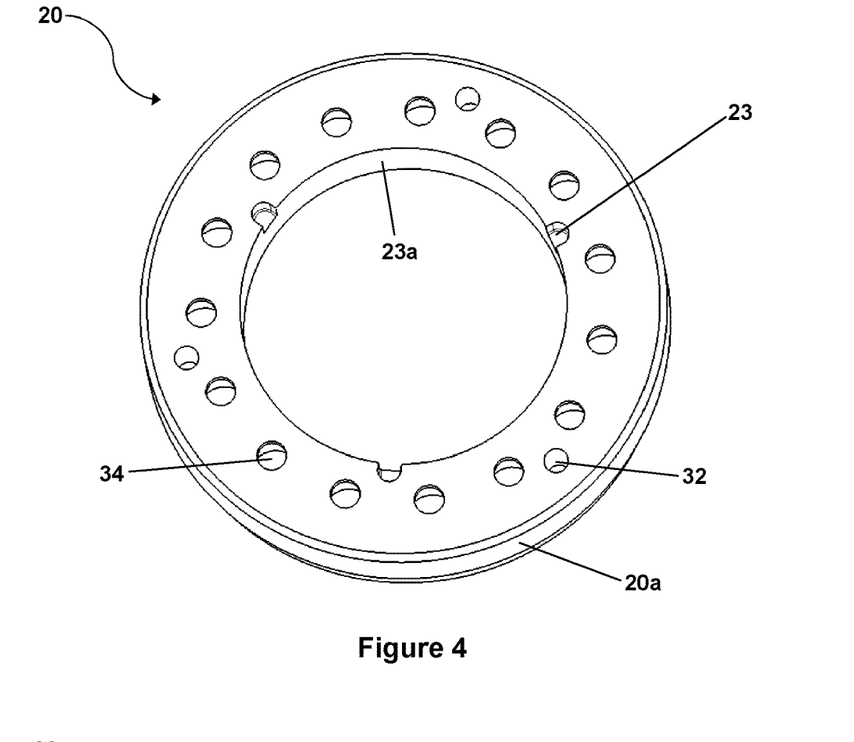
FIG. 4 is a 3D view of an exemplary adjustment nut, used in the exemplary device of FIGS. 1 and 2.

FIG. 4 shows a view of an exemplary adjustment nut 20, in accordance with the present disclosure. As can be seen in this exemplary embodiment, the adjustment nut 20 features grooves 23 machined into its inner circumference 23a, which are configured to mate with an adjustment tool (not shown) to facilitate rotation of the adjustment nut 20 to allow backlash adjustment. It is to be understood that any suitable means of facilitating rotation of the adjustment nut 20 falls within the scope of this disclosure, for instance, grooves 23 may be placed at other points on the adjustment nut 20 and may be shaped in any appropriate way for an appropriate tool. In addition, the adjustment mechanism may not necessarily be grooves 23, for instance, there may be one or more posts that protrude from the adjustment nut 20, which are configured to mount to an adjustment tool or allow the nut 20 to be turned by hand.

Figure 6:
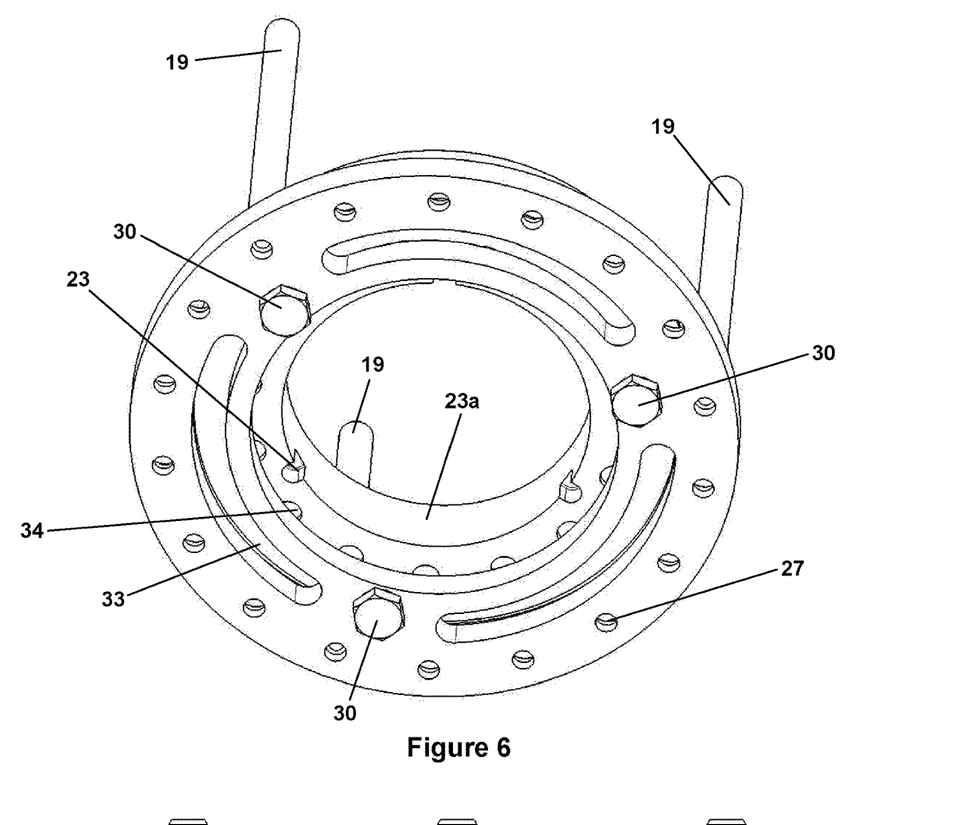
FIG. 6 is a 3D view of an exemplary adjustment nut assembly, used in the exemplary device of FIGS. 1 and 2.
Figure 7:
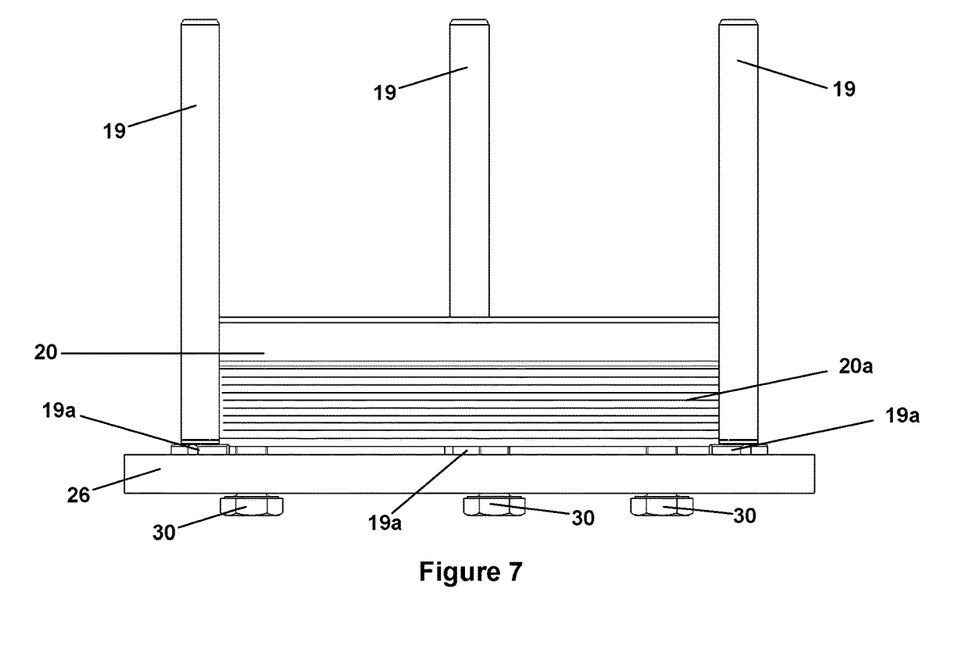
FIG. 7 is a 3D side view of the nut assembly shown in FIG. 6.

As also shown in FIG. 4, the adjustment nut 20 comprises threaded locking screw holes 32 and fitting aid holes 34, whose purpose will become clear with regard to the description of FIGS. 6 and 7, respectively. As will be discussed in more detail below with regard to FIG. 7, there may be any number of locking screw holes 32, as required.

Figure 5:
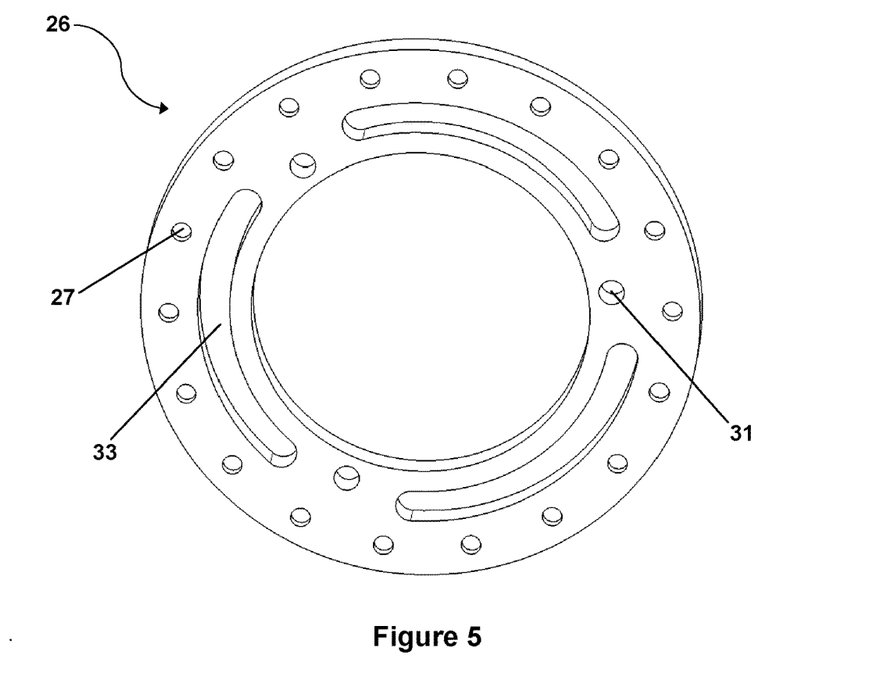
FIG. 5 is a 3D view of an exemplary cover plate, used in the exemplary device of FIGS. 1 and 2.

FIG. 5 shows an exemplary cover plate 26, which is used to fix the adjustment nut 20 in place and cap the device housing 12. The cover plate 26 features pawl axis holes 27 and threaded locking screw holes 31, as well as sight grooves 33.

Figure 9:
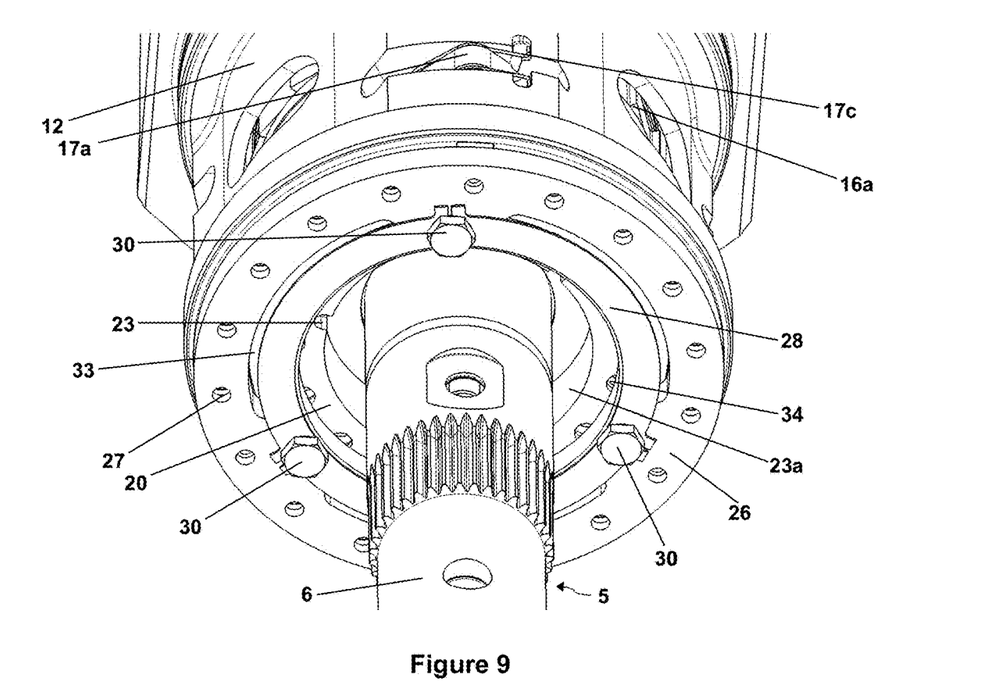
FIG. 9 is a 3D end view of a no-back device in accordance with an embodiment of the present disclosure.

FIGS. 6 and 7 show the cover plate 26 secured to adjustment nut 20, without the other parts of the no-back device 10. As can be seen, adjustment nut 20 is secured to the cover plate 26 using externally threaded locking screws 30, which pass through cover plate locking screw holes 31 and engage with internally threaded locking screw holes 32 in the adjustment nut 20. This will effectively lock the position of the adjustment nut 20 relative to the cover plate 26, when in use with the device. As can be seen in FIG. 9 (described in more detail below), a washer plate 28 is disposed between the locking screws 30 and the cover plate 26. It should be understood that, although in this exemplary embodiment the washer plate 28 is shown as a ring, the plate 28 could be any suitable shape, for instance a disk. As shown in FIG. 6 (and also apparent from FIG. 7), the cover 26 is secured such that one pawl axis hole 27 aligns with each of the pawl shafts 19 and receives a pawl shaft head 19a. The engagement of the pawl shaft head 19a and the cover 26 prevents rotation of the cover 26 (and thus the nut 20) relative to the housing 12.

In this embodiment there are three equally spaced pawl shafts 19, so a minimum of three equally spaced pawl axis holes 27 are needed to locate the pawl shaft heads 19a.

In this embodiment there are more pawl axis holes 27 than pawl shafts 19. It should be understood, however, that any number of pawl shafts 19 and locating pawl axis holes 27 (provided there are at least the same number of holes 27 as shafts 19) may be used, as desired, within the scope of this disclosure.

Figure 8:
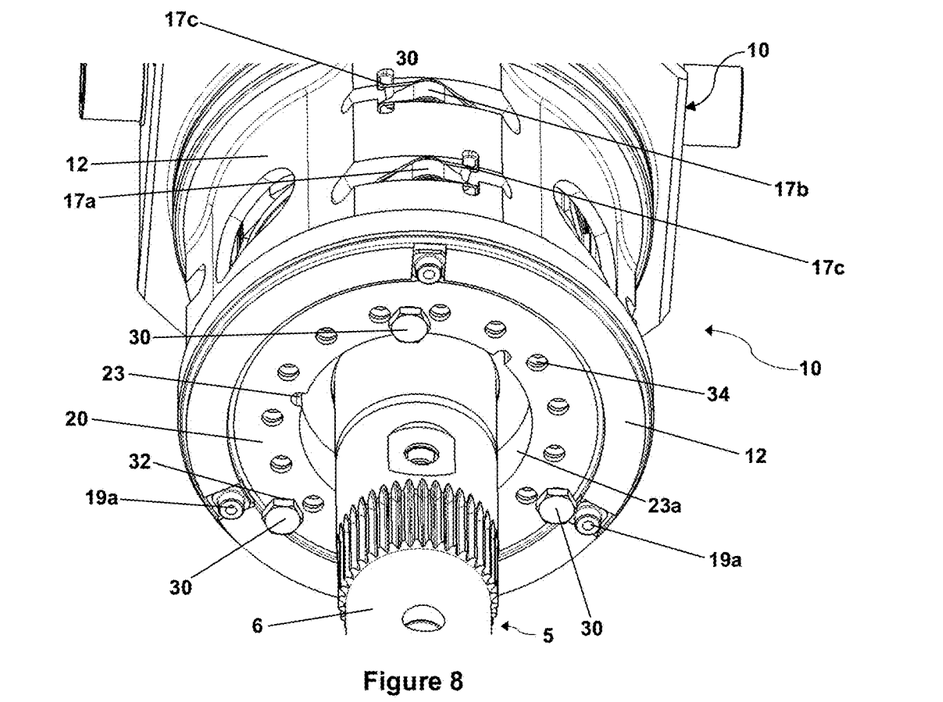
FIG. 8 is a 3D end view of a no-back device in accordance with an embodiment of the present disclosure.

FIGS. 8 and 9 show an end view of the device housing 12 showing the placement of the adjustment nut 20 and cover plate 26 in the device housing 12. There are two primary methods that are envisaged for allowing adjustment of nut 20.

The first method involves the cover plate 26 and adjustment nut 20 being turned by a set minimum rotation that corresponds to a set backlash adjustment value. The backlash adjustment value may be determined by measuring the existing backlash in the no-back device and then calculating the difference needed to reach the desired value. As shown in FIGS. 4-7, the cover plate 26 and the adjustment nut 20 may have the same number of locking screw holes 31, 32. This means that the nut 20 and the plate 26 need to be rotated to the same degree to allow screw holes 31, 32 to match up, so that the adjustment nut 20 can be set in position and the cover plate 26 secured to the housing 12 via locking screws 30. Since cover plate 26 engages with pawl shaft heads 19a by rotation to adjacent pawl axis holes 27, the minimum rotation of the cover plate 26 is set as the angular distance between each adjacent pawl axis hole 27. Therefore the pawl axis holes 27 act as an adjustment guide, as they dictate the minimum possible rotation of the cover plate 26. By knowing the backlash adjustment caused by the rotation between adjacent pawl axis holes 27 (e.g. 0.05 mm), a user can accurately adjust the backlash B as required, by matching the amount of rotation of the adjustment nut 20 thereto, such that screw holes 31, 32 line up. Matching up of the screw holes 31, 32 is aided by sight grooves 33 in the cover plate 26, which allow a user to view the positioning of screw holes 32 as they rotate the adjustment nut 20 into alignment with the cover plate screw holes 31.

It is to be understood that the number of pawl axis holes 27 in cover plate 26 may be any suitable number to provide the desired rotational sensitivity for backlash adjustment B.

The second method involves providing the adjustment nut 20 with more locking screw holes 32 than the cover plate 26. This allows the adjustment nut 20 to be rotated by a smaller amount than the cover plate 26 to provide aligned screw holes 31, 32. This may give more fine adjustment of adjustment nut 20 than the first method, as it can be rotated by an amount less than the set angular distance between adjacent pawl axis holes 27. It is to be understood that any number of cover plate screw holes 32 can be provided to give any amount of adjustment sensitivity as needed. In this method, fitting aid holes 34 can act as a guide for the amount of adjustment made by making a rotation that is between adjacent pawl axis holes 27. By knowing the backlash adjustment caused from one nut 20 turn between adjacent pawl axis holes 27 and by rotating nut 20 such that fitting aid holes 34 rotate a known or estimated percentage of the angular distance between adjacent pawl axis holes 27, a user can make an accurate fine adjustment in backlash B (e.g. 0.01 mm). As shown in FIGS. 4-6, to facilitate this fine adjustment the number of fitting aid holes 34 is the same as the number of pawl axis holes 27 for any given cover plate 26 and adjustment nut 20 combination. It is to be understood that more or fewer fitting aid holes 34 may be used within the scope of this disclosure, depending on the backlash adjustment sensitivity required. Once the adjustment nut 20 has been rotated to the correct amount, the locking screws 30 and washer plate 28 are secured to lock the nut 20 and cover plate 26 in place, as shown in FIG. 9.

The combination of the cover plate 26 and the adjustment nut 20 allows a user to adjust the backlash B in the no-back device much more easily and with less intrusion than previous devices. For instance, the backlash B of the device can be adjusted without having to open or remove the device housing 12. The backlash B can also be adjusted easily and accurately to account for wear of device components which would otherwise need replacing to restore the correct backlash B value. This reduces the frequency of part replacement and cost of maintenance.

Although the figures and the accompanying description describe particular embodiments, it is to be understood that the scope of this disclosure is not to be limited to such specific embodiments, and is, instead, to be determined by the following claims.

The invention claimed is:

1. An actuator for varying the position of a flight control surface on an aircraft, the actuator comprising:
   a ballscrew, having a screw; and
   a no-back device positioned around an axial section of the screw and configured to prevent back-driving of the screw, and to allow a limited backlash (B), the backlash (B) being the possible amount of axial movement of the screw relative to the no-back device, wherein the no-back device comprises a backlash adjuster arranged to select a plurality of different backlash lengths.

2. The actuator of claim 1, wherein the no-back device is configured such that moving the backlash adjuster axially relative to the screw adjusts the backlash (B).

3. The actuator of claim 2, wherein the backlash adjuster comprises a threaded member, such as an adjustment nut, and moving the threaded member axially relative to the screw comprises rotating the threaded member relative to the screw.

4. The actuator of claim 1, wherein the no-back device comprises:
   a first brake assembly for preventing rotation of the screw in one direction;
   a second brake assembly for preventing rotation of the screw in a second direction; and
   a radially extending flange operatively connected to the screw for rotation therewith, wherein the flange is positioned between the first and second brake assemblies.

5. The actuator of claim 4, wherein the no-back device further comprises a housing at least partially surrounding a portion of the screw, and the housing has a first end having an opening for receiving the backlash adjuster and a second opposed end, the first brake assembly is positioned between the flange and the backlash adjuster, the second brake assembly is positioned between the flange and the second end and moving the backlash adjuster axially relative to the screw causes the separation between the backlash adjuster and the second end to be varied accordingly.

6. The actuator of claim 4, wherein the no-back device comprises one or more biasing members for urging the first and second brake assemblies towards the flange.

7. The actuator of claim 6, wherein the one or more biasing members comprise one or more springs, and moving the backlash adjuster causes the compression on the one or more springs to be varied.

8. The actuator of any of claim 4, wherein the first and second brake assemblies each comprise a friction plate for engagement with the flange and a ratchet wheel having one or more pawls associated therewith.

9. The actuator of claim 1, wherein the backlash adjuster is arranged to select at least three, at least five or at least ten different backlash lengths.

10. The actuator of claim 1, further comprising a lock for retaining the backlash adjuster in a chosen position.

11. The actuator of claim 10, wherein the lock comprises one or more fastening members and a plate having one or more first apertures for receiving the one or more fastening members, and the backlash adjuster comprises one or more second apertures for receiving the one or more fastening members.

12. A method of adjusting the backlash (B) in a flight control surface actuator having the features of claim 1, the method comprising moving the backlash adjuster axially relative to the screw to adjust the backlash (B) to a desired value.

13. The method claim 12, wherein moving the backlash adjuster axially comprises rotating the backlash adjuster relative to the screw.

14. The method of claim 12, wherein the no-back device comprises a lock having a plate and one or more fastening members and the method further comprises passing the one or more fastening members through one or more first apertures in the plate and into one or more second apertures in the backlash adjuster to secure the backlash adjuster axially.

15. The method of claim 14, wherein the plate is configured such that, prior to inserting the fastening members, the backlash adjuster can be moved axially with the plate in place on the no-back device.

* * * * *